United States Patent
Kamen et al.

(10) Patent No.: US 6,561,294 B1
(45) Date of Patent: May 13, 2003

(54) BALANCING VEHICLE WITH PASSIVE PIVOTABLE SUPPORT

(75) Inventors: Dean L. Kamen, Bedford, NH (US); Robert R. Ambrogi, Manchester, NH (US); Robert Duggan, Stafford, NH (US); Douglas Field, Bedford, NH (US); Richard Kurt Heinzmann, Francetown, NH (US)

(73) Assignee: DEKA Products Limited Partnership, Manchester, NH (US)

( * ) Notice: Subject to any disclaimer, the term of this patent is extended or adjusted under 35 U.S.C. 154(b) by 0 days.

(21) Appl. No.: 09/386,686

(22) Filed: Aug. 31, 1999

(51) Int. Cl.$^7$ .............................................. B62D 61/00
(52) U.S. Cl. ........................ 180/21; 180/7.1; 180/8.2; 180/65.8
(58) Field of Search ........................... 180/7.1, 21, 8.2, 180/65.8, 907, 5.26, 218, 6.5, 13; 280/5.28, 5.38, 208, 78, 209, 218, 205, 229, 266, 282; 297/195, 338, 344.15, 344.16, 311, 313

(56) References Cited

U.S. PATENT DOCUMENTS

| | | | | |
|---|---|---|---|---|
| 3,145,797 A | * | 8/1964 | Taylor ........................... | 180/21 |
| 3,399,742 A | * | 9/1968 | Malich .......................... | 180/21 |
| 3,682,509 A | * | 8/1972 | Worley ......................... | 297/195 |
| 3,907,051 A | | 9/1975 | Weant et al. ................. | 180/6.2 |
| 4,155,590 A | * | 5/1979 | Cunningham ............... | 297/195 |
| 4,241,931 A | | 12/1980 | Healy .......................... | 280/205 |
| 4,757,868 A | * | 7/1988 | Cresswell .................... | 180/13 |
| 4,909,525 A | * | 3/1990 | Flowers ...................... | 180/210 |
| 4,944,360 A | | 7/1990 | Sturges ....................... | 180/210 |
| 5,020,624 A | * | 6/1991 | Nesterick et al. ........... | 180/210 |
| 5,048,891 A | * | 9/1991 | Yach ........................... | 297/195 |
| 5,366,036 A | * | 11/1994 | Perry .......................... | 180/6.5 |
| 5,701,965 A | * | 12/1997 | Kamen et al. ............... | 180/7.1 |

FOREIGN PATENT DOCUMENTS

| | | | | |
|---|---|---|---|---|
| DE | WO 89/06117 | * | 1/1989 | ........................ 5/4 |
| DE | 38 00 476 | | 7/1989 | |
| JP | 6-105415 | | 12/1989 | |
| JP | 404201793 | * | 7/1992 | |
| WO | 96/23478 | | 8/1996 | |

OTHER PUBLICATIONS

Kanoh, *Adaptive Control of Inverted Pendulum, Computrol*, vol. 2, pp. 69–75 (1983).*

Yamafuji, *A Proposal for Modular–Structured Mobile Robots for Work that Principally Involve a Vehicle with Two Parallel Wheels, Automation Technology*, vol. 20, pp. 113–118 (1988).*

Yamafuji & Kawamura, *Study of Postural and Driving Control of Coaxial Bicycle*, Paper Read at Meeting of Japan Society of Mechanical Engineering (Series C), vol. 54, No. 501, pp. 1114–1121 (May, 1988).*

Yamafuji et al., *Synchronous Steering Control of a Parallel Bicycle*, Paper Read at Meeting of Japan Society of Mechanical Engineering (Series C), vol. 55, No. 513, pp. 1229–1234 (May, 1989).*

Momoi & Yamafuji, *Motion control of the Paralell Bicycle–Type Mobile Robot Composed of a Triple Inverted Pendulum*, Paper Read at Meeting of Japan Society of Mechanical Engineering (Series C), vol. 57, No. 541, pp. 154–159 (Sep., 1991).*

* cited by examiner

Primary Examiner—Brian L. Johnson
Assistant Examiner—Hau Phan
(74) Attorney, Agent, or Firm—Bromberg & Sunstein LLP

(57) ABSTRACT

A balancing vehicle that supports a rider on a support such as a seat in a such a manner as to allow the position of the center of gravity of the vehicle to be varied by motion of the support. Motion of the support additionally provides for control of a drive that propels the vehicle in a manner responsive to the position of the center of gravity. The vehicle is thus capable of control by leaning of a seated rider.

10 Claims, 6 Drawing Sheets

BALANCING VEHICLE WITH PASSIVE PIVOTABLE SUPPORT

This application is a continuation in part application of copending U.S. application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091.

TECHNICAL FIELD

The present invention pertains to a balancing personal vehicle having a support for a human subject, the support being pivotable in order to allow the subject to be supported at a desired angle with respect to ground contacting elements of the vehicle.

BACKGROUND OF THE INVENTION

Personal vehicles may be self-propelled and user-guidable, and, further, may entail stabilization in one or both of the fore-aft or left-right planes, such as whey no more than two wheels are in ground contact at a time. Vehicles of this sort may be operated in a mode in which motion of the vehicle, including acceleration (both linear and turning), is controlled partially or entirely by leaning of the vehicle as caused by a subject riding the vehicle. Several such vehicles are described in U.S. Pat. No. 5,971,091, issued Oct. 26, 1999, which is incorporated herein by reference.

Such balancing vehicles may lack static stability. Referring, for example, to FIG. 1A, wherein a prior art personal transporter is shown and designated generally by numeral 18, a subject 10 stands on a support platform 12 and holds a grip 14 on a handle 16 attached to the platform 12, so that the vehicle 18 of this embodiment may be operated in a manner analogous to a scooter. A control loop may be provided so that leaning of the subject results in the application of torque to wheel 20 about axle 22 thereby causing an acceleration of the vehicle. Vehicle 18, however, is statically unstable, and, absent operation of the control loop to maintain dynamic stability, subject 10 will no longer be supported in a standing position and will fall from platform 12. Another prior art balancing vehicle is shown in FIG. 1B and designated generally by numeral 24. Personal vehicle 24 shares the characteristics of vehicle 12 of FIG. 1A, namely a support platform 12 for supporting subject 10 and grip 14 on handle 16 attached to platform 12, so that the vehicle 18 of this embodiment may also be operated in a manner analogous to a scooter. FIG. 2 shows that while vehicle 24 may have clusters 26 each having a plurality of wheels 28, vehicle 24 remains statically unstable and, absent operation of a control loop to maintain dynamic stability, subject 10 will no longer be supported in a standing position and may fall from platform 12.

SUMMARY OF THE INVENTION

In accordance with a preferred embodiment of the invention, there is provided a device for transporting a human subject over a surface. The device has a platform defining a fore-aft plane that supports a payload including the human subject. The device also has a ground-contacting module that includes a ground-contacting member movably coupled to the platform. The platform and the ground-contacting module are components of an assembly, and the position of the center of gravity of the assembly is defined with respect to the ground-contacting member. The device also has a support for supporting the subject, where the support is coupled to the platform in such as manner as to permit variation in the fore-aft plane of the position of the center of gravity. Furthermore, the device has a drive, coupled to the ground contacting module, for delivering power to the ground-contacting module in a manner responsive to the position of the center of gravity.

In accordance with alternate embodiments of the present invention, the support includes a seat. The support may be coupled to the platform at a pivot oriented to allow motion of the support about an axis substantially transverse to the fore-aft plane. The device may have a handle, affixed to the platform, having a grip at approximately waist height of the subject, so that the device may be operated in a manner analogous to a scooter. The ground-contacting module may be characterized by a region of contact with the ground and the support may have an articulated member, biased for supporting a portion of the weight of the subject, and the support may have a region of local stability substantially above the region of contact with the ground of the ground-contacting module.

In accordance with a further embodiment of the invention, there is provided a device for carrying a user, wherein the device has a platform and a user support having a position defined with respect to the platform and coupled to the platform in such a manner that the user may vary the position of the support with respect to the platform in the course of normal operation of the device. The device also has a motorized drive that propels the platform over an underlying surface through motion of at least one ground-contacting member and a controller, coupled to the motorized drive, for governing the operation of the motorized drive at least in response to the position of the user support.

In accordance with yet a further embodiment of the invention there is provided a device for conveying a seated user. The device has a platform for supporting a payload including the seated user, a ground-contacting module mounted to the platform that propels the platform with respect to an underlying surface, and a drive, coupled to the ground-contacting module, for delivering power to the ground-contacting module in a manner controlled solely by leaning of the user.

BRIEF DESCRIPTION OF THE DRAWINGS

The invention will be more readily understood by reference to the following description, taken with the accompanying drawings, in which.

DETAILED DESCRIPTION OF PREFERRED EMBODIMENTS

Figure 1A:
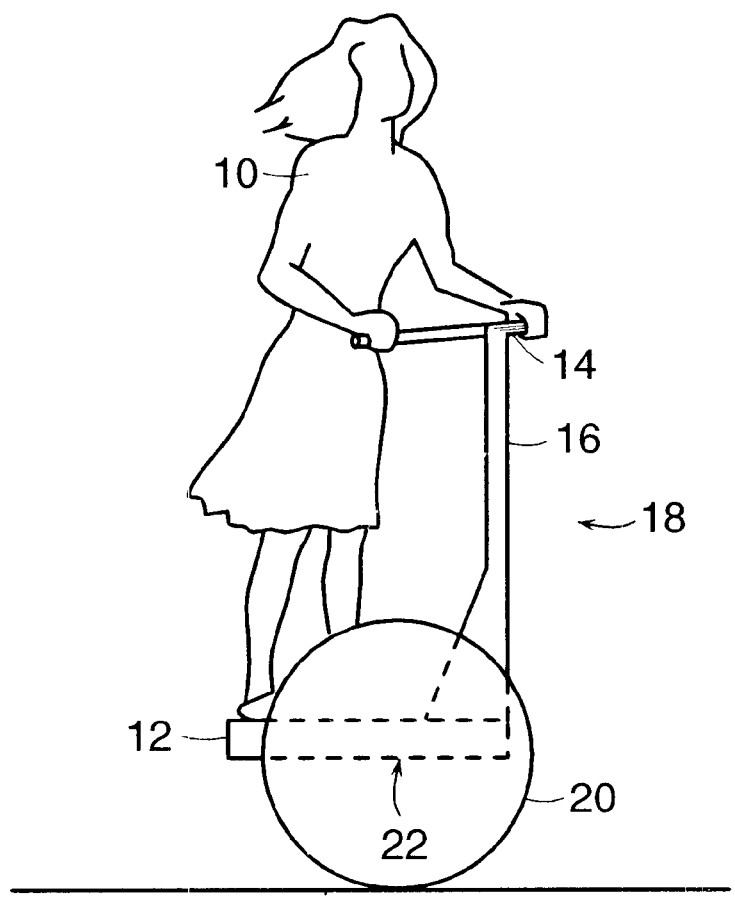
FIG. 1A is a side view of a prior art dynamically balancing vehicle of the type in which an embodiment of the invention may be advantageously employed.
Figure 1B:
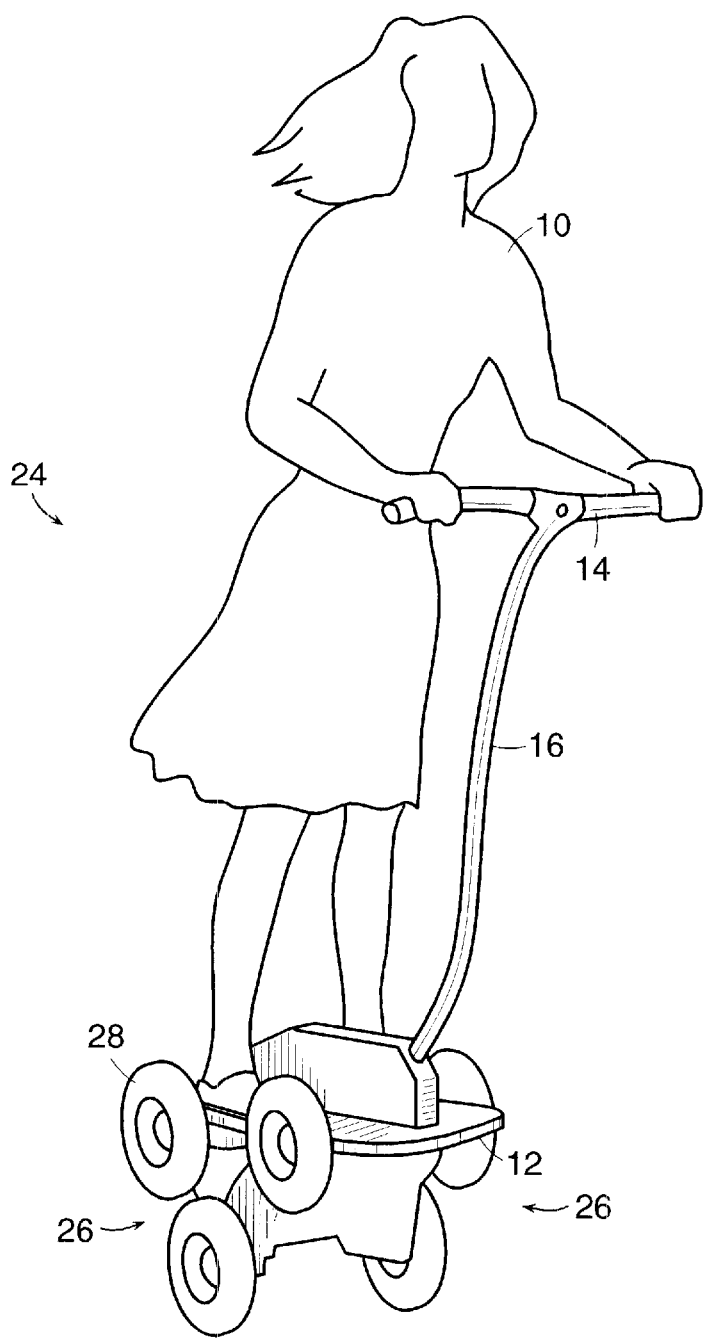
FIG. 1B is a side view of a further prior art dynamically balancing vehicle of the type in which an embodiment of the invention may be advantageously employed.

Referring to FIG. 1A, prior art balancing vehicle 18 does not provide a seat for the subject 10 using the vehicle. The subject stands on a platform 12 and holds a grip 14 on handle 16 attached to platform 12, so that the vehicle of this embodiment may be operated in a manner analogous to a scooter. The pitch of the vehicle may be sensed and compensated for in the control loop, so that if the subject leans forward, the vehicle will move forward, and similarly, leaning in other directions may cause corresponding motion of the vehicle. Accordingly, a forward lean will cause forward movement; a backward lean will cause backward movement. Appropriate force transducers may be provided to sense leftward and rightward leaning and related controls provided to cause left and right turning as a result of the sensed leaning. The leaning may also be detected using proximity sensors. Similarly, the vehicle of this embodiment may be equipped with a foot- (or force-) actuated switch to activate the vehicle, in such a manner that the switch is closed so as to power the vehicle automatically when the subject stands on the platform 12.

Figure 2:
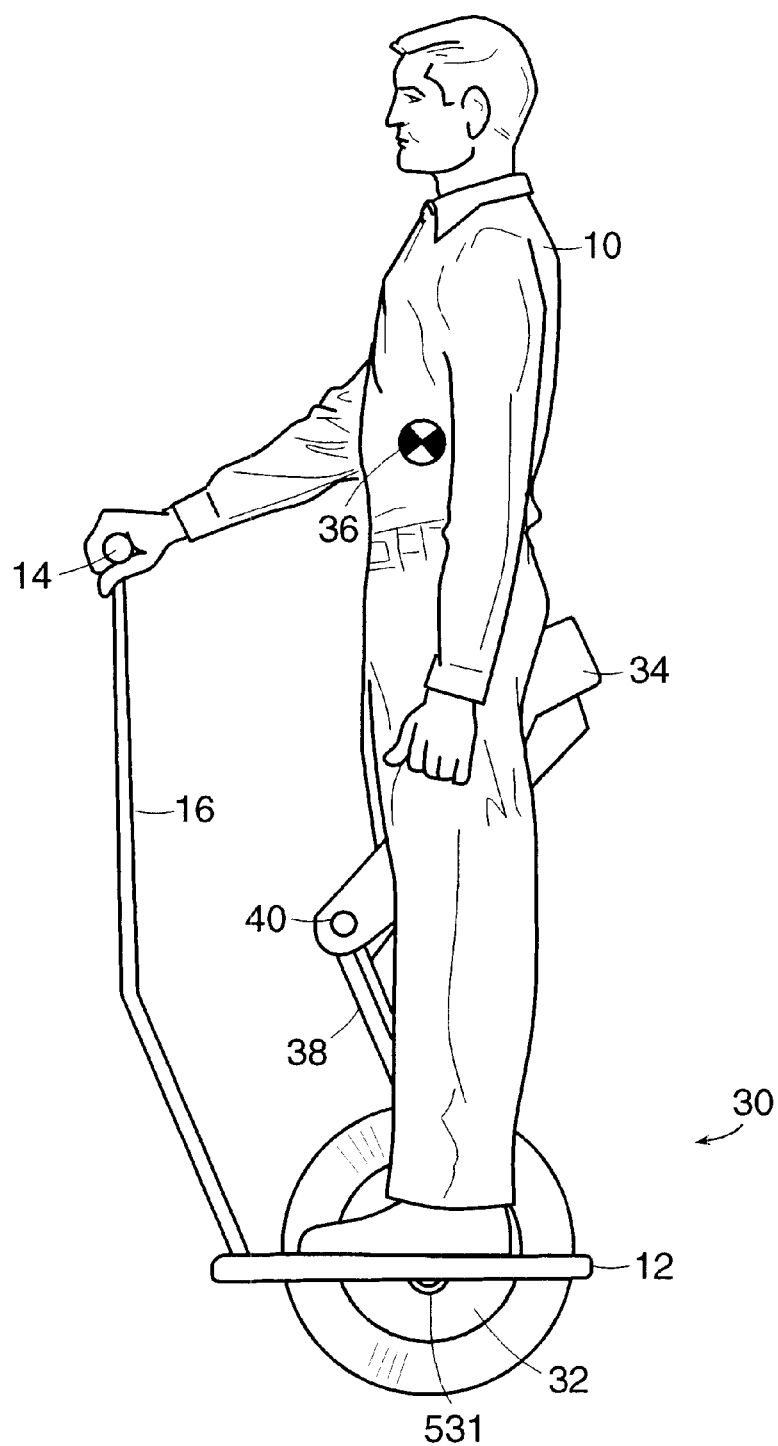
FIG. 2 is a side view of a dynamically balancing vehicle having an articulated pivotable support in accordance with an embodiment of the invention.

Referring now to FIG. 2, a personal vehicle 30 is shown of the type in which pitch of the vehicle may be sensed and compensated for by application of torque to one or more wheel 32 (or other ground-contacting members) by operation of a control loop (not shown) and wheel actuator (not shown), so that if subject 10 leans forward, the vehicle is caused to move forward. As described in U.S. Pat. No. 5,971,091 at col. 5, lines 24 to 33, which is incorporated above by reference, a drive 531 delivers power to the ground-contacting members. It to be understood that platform 12 is not necessarily coupled directly to wheel 32. Tilting of the vehicle is not necessarily canceled during ordinary operation of the vehicle, so that sustained motion and sustained acceleration may be achieved. In accordance with an embodiment of the present invention, a seat 34 is provided for supporting a portion of the weight of subject 10. Subject 10 may still vary the position of his center of gravity, and the position of the center of gravity 36 of the combination of vehicle 30 and subject 10 while seat 34 continues to support a portion of the weight of the subject by virtue of the pivotability of seat 34 with respect to platform 12.

It is to be understood that within the scope of the present invention, as described herein and as claimed in any appended claims, wheel 32 may rotate about a single axle, or, alternatively, about an axis that may vary in orientation, in the manner of a uniball.

Figure 3:
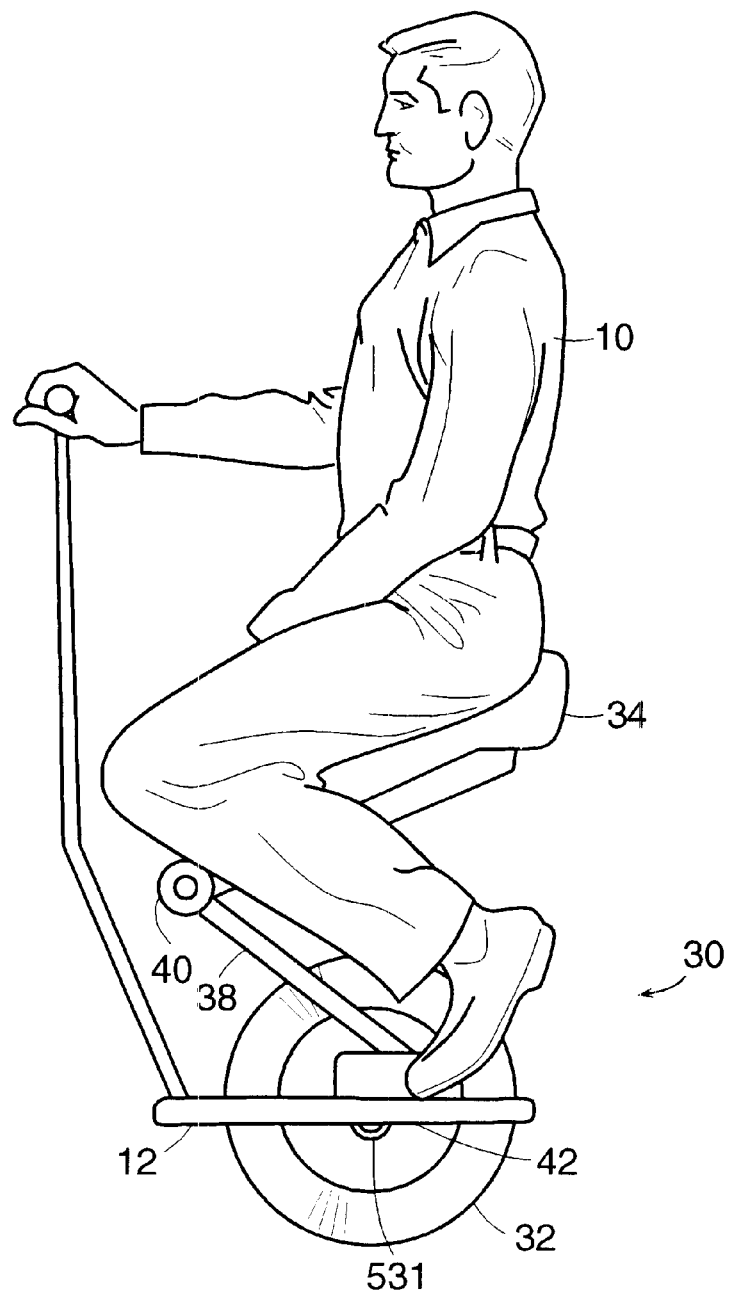
FIG. 3 is a side view of the dynamically balancing vehicle of FIG. 2 showing the articulated pivotable support in a partially folded configuration.

Seat 34 may be coupled to platform 12 by any of a variety of mechanisms. In accordance with a preferred embodiment of the present invention, seat 34 is coupled to platform 12 via link 38, itself pivotally coupled to platform 12, and coupled to seat 34 at knee joint 40. The articulated support comprising seat 34 and link 38 may be biased by a spring arrangement (not shown) or its equivalent so as to counter the weight of the subject. FIG. 3 shows seat 34 depressed at knee joint 40 with respect to link 38. Additionally, pivot 42 is shown coupling link 38 to support platform 12 in a manner as to constrain link 38 to fore-aft motion about an axis substantially transverse to the fore-aft plane. The spring arrangement (not shown) may include any means, such as a coil spring or a gas spring, known for biasing the support mechanism for supporting some fraction of the weight of the subject. Additionally, mechanisms known in the art for providing for translation of seat 34 in a fore-aft direction for shifting the weight of subject 10 with respect to ground-contacting member 32 are within the scope of the present invention.

Figure 4A:
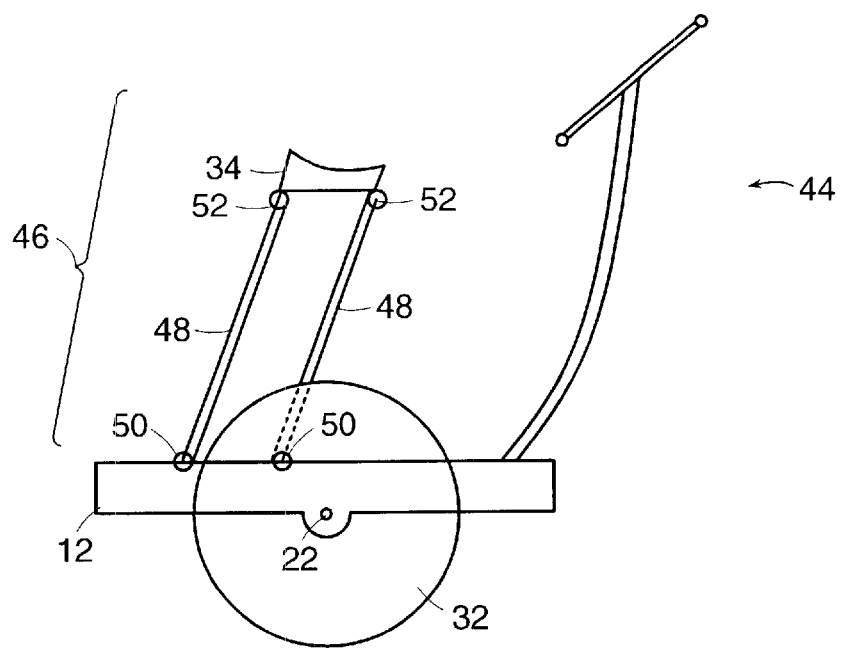
FIG. 4A is a side view of a dynamically balancing vehicle showing an articulated pivotable support in a further embodiment of the present invention.
Figure 4B:
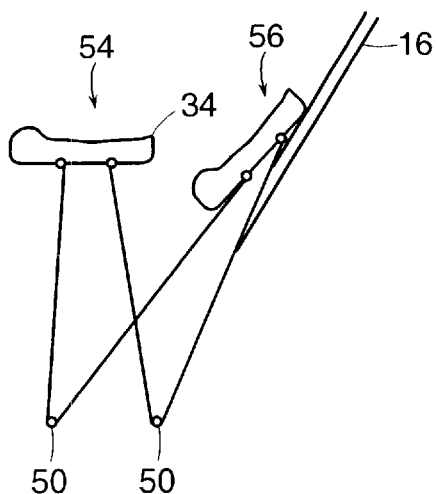
FIG. 4B is a further side view of the embodiment of FIG. 4A showing two positions of the pivotable support.

An alternative to the articulating folding seat of the embodiment of FIG. 3 is described with reference to FIG. 4A. A balancing personal vehicle 44 is shown in which seat 34 may be pivoted with respect to support platform 12 by means of a seat support mechanism designated generally by numeral 46. Seat support 46 has two substantially linear members 48 which pivot in about pivots 50 through which linear members 48 are coupled to platform 12. Linear members 48 are coupled to seat 34 at pivots 52. A subject seated on seat 34 may shift her weight, and thereby the center of gravity of the combination of vehicle and subject, by moving seat 34 in a fore-aft direction. FIG. 4B shows the articulating folding seat of FIG. 4A in two positions: the position designated 54 places the center of gravity of the vehicle, including the rider, substantially above the region of contact of the ground-contacting member 20 (shown in FIG. 4A) with the ground. Seat 34 may also be folded up toward handle 16 as in the position designated by numeral 56. In the embodiment shown in FIGS. 4A and 4B, seat 34 is highest, and thus possesses the greatest potential energy, in central position 54.

Figure 5A:
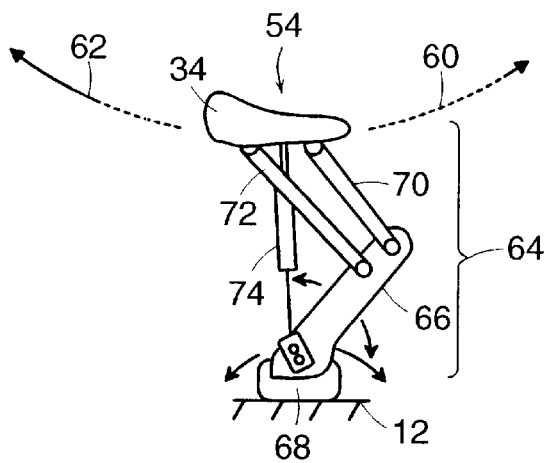
FIG. 5A is a side view of a pivotable support having a central equilibrium position in accordance with a further embodiment of the present invention.
Figure 5B:
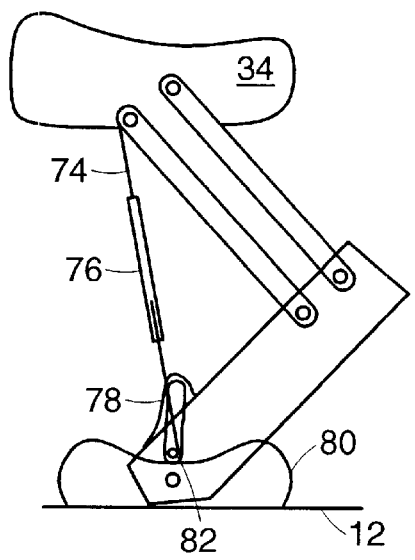
FIG. 5B is a further side view of the embodiment of FIG. 5A showing detail of a cam-follower arrangement.

Referring now to FIG. 5A, in accordance with other embodiments of the present invention, stability is provided by ensuring that the central position of the seated user, substantially above axle 22, is a stable position, i.e., a position characterized by a local minimum of potential energy. Thus, with respect to the central position designated by numeral 54, seat 34 is displaced further from platform 12, and thus higher above level ground, as seat 34 is moved by virtue of the rider moving in either a forward direction 60 or an aft direction 62. In accordance with the embodiment depicted in FIG. 5A, seat 34 is supported by a substantially trilateral arrangement 64 of links. Arm 66 pivots about a pivot point 68 fixed with respect to platform 12, while link 70 couples arm 66 to seat 34. Link 72, substantially parallel to link 70, supports seat 34 in a substantially horizontal orientation in its central position 54. The third side of trilateral arrangement 64 is formed by link 74. Link 74, as shown in greater detail in FIG. 5B, may be a rigid member or a suspension member, as shown, containing a gas spring 76 which serves to cushion seat 34 with respect to vibration transmitted from the road surface through platform 12. Link 74 is coupled to cam follower 78 which rides on cam surface 80 in such a manner as to provide a well 82 of stability at the center of motion of seat 34. If seat 34 moves fore or aft, cam follower 78 is driven up cam 80, thereby increasing the height of seat 34 relative to platform 12 relative to its position of stability at the center. This reduces the effort required of the rider to maintain a centered body position, thereby advantageously allowing the rider to maintain a more relaxed position and momentarily to remove his/her hands from the handlebar.

It is to be understood that other mechanical configurations providing for seat 34 to rise as seat 34 is moved either forward or aft of its central position 54 wherein the center of gravity of the vehicle and rider is substantially over the region of contact of the vehicle with the ground are within the scope of the present invention as claimed in the appended claims.

The described embodiments of the invention are intended to be merely exemplary and numerous variations and modifications will be apparent to those skilled in the art. All such variations and modifications are intended to be within the scope of the present invention as defined in the appended claims.

We claim:

1. A device for transporting a human subject over a surface, the device comprising:
   a. platform defining a fore-aft plane, the platform supporting a payload including the human subject;
   b. a ground-contacting module, including a ground-contacting member movably coupled to the platform, the ground contacting member characterized by a region of contact with the ground, the platform and the ground-contacting module being components of an assembly having a center of gravity, the center of gravity having a position defined with respect to the ground-contacting member;
   c. a support for supporting the subject, the support coupled to the platform in such a manner as to permit variation of the position of the center of gravity in the fore-aft plane by a movement of the support by the subject with respect to the platform while the device traverses the surface; and
   d. a drive, coupled to the ground-contacting module, for delivering power to the ground-contacting module in a manner responsive to the position of the center of gravity.

2. A device in accordance with claim 1, wherein the support includes a seat.

3. A device according to claim 1, wherein the support is coupled to the platform at a pivot oriented to allow motion of the support about an axis substantially transverse to the foreaft plane.

4. A device according to claim 1, further comprising a handle, affixed to the platform, having a grip at approximately waist height of the subject, so that the device may be operated in a manner analogous to a scooter.

5. A device according to claim 1, wherein the support includes an articulated member, biased for supporting a portion of the weight of the subject.

6. A device according to claim 1, wherein the support has a position of local stability substantially above the region of contact with the ground of the ground-contacting module.

7. A device according to claim 1, wherein the movement of the support by the subject with respect to the platform occurs both fore and aft of any line extending vertically above the region of contact with the ground.

8. A device for carrying a user, the device comprising:
   a) a platform:
   b) a user support including a seat having a position defined with respect to the platform and coupled to the platform in such a manner that the user may vary the position of the support with respect to the platform in the course of normal operation of the device while seated;
   c) a motorized drive that propels the platform over an underlying surface through motion of at least one ground-contacting member, the device being unstable with respect to tipping when the motorized drive is not powered: and
   d) a controller, coupled to the motorized drive, for governing the operation of the motorized drive at least in response to the position of the user support.

9. A device according to claim 8, wherein the position of the support with respect to the platform may be varied by leaning of the user.

10. A device according to claim 8, wherein the device is unstable with respect to tipping when the motorized drive is not powered.

* * * * *

UNITED STATES PATENT AND TRADEMARK OFFICE
CERTIFICATE OF CORRECTION

PATENT NO.      : 6,561,294 B1
DATED           : May 13, 2003
INVENTOR(S)     : Dean L. Kamen, et al.

It is certified that error appears in the above-identified patent and that said Letters Patent is hereby corrected as shown below:

<u>Title page,</u>
Add Item:
-- [63] Related U.S. Aplication Data,
"This application is a continuation in part application of copending U.S. application serial no. 09/325,976 filed June 4, 1999, which is a continuation in part of U.S. application serial no.08/479,901, filed June 7, 1995, now issued as U.S. Patent no. 5,975,225, which is a continuation in part of U.S. application serial no. 08/384,705, filed February 3, 1995, now issued as U.S. Patent no. 5,971,091. --

Signed and Sealed this

Sixteenth Day of September, 2003

JAMES E. ROGAN
*Director of the United States Patent and Trademark Office*